United States Patent
Pettis et al.

(10) Patent No.: US 10,682,814 B2
(45) Date of Patent: Jun. 16, 2020

(54) GRAYSCALE RENDERING IN 3D PRINTING

(71) Applicant: MakerBot Industries, LLC, Brooklyn, NY (US)

(72) Inventors: Nathaniel B. Pettis, Brooklyn, NY (US); Adam G. Mayer, Brooklyn, NY (US); Anthony James Buser, Linden, NJ (US)

(73) Assignee: MakerBot Industries, LLC, Brooklyn, NY (US)

( * ) Notice: Subject to any disclaimer, the term of this patent is extended or adjusted under 35 U.S.C. 154(b) by 186 days.

(21) Appl. No.: 16/003,546

(22) Filed: Jun. 8, 2018

(65) Prior Publication Data

US 2018/0290385 A1 Oct. 11, 2018

Related U.S. Application Data

(63) Continuation of application No. 15/006,011, filed on Jan. 25, 2016, now Pat. No. 10,016,943, which is a continuation of application No. 13/478,233, filed on May 23, 2012, now Pat. No. 9,248,623.

(60) Provisional application No. 61/547,132, filed on Oct. 14, 2011.

(51) Int. Cl.
| | |
|---|---|
| *B32B 3/10* | (2006.01) |
| *B29C 64/386* | (2017.01) |
| *B29C 64/106* | (2017.01) |
| *B29C 64/20* | (2017.01) |
| *B33Y 40/00* | (2020.01) |
| *B33Y 30/00* | (2015.01) |
| *B33Y 50/02* | (2015.01) |
| *B33Y 70/00* | (2020.01) |
| *B33Y 80/00* | (2015.01) |
| *B29K 55/02* | (2006.01) |

(52) U.S. Cl.
CPC .......... *B29C 64/386* (2017.08); *B29C 64/106* (2017.08); *B29C 64/20* (2017.08); *B32B 3/10* (2013.01); *B29K 2055/02* (2013.01); *B29K 2995/0021* (2013.01); *B32B 2307/40* (2013.01); *B32B 2559/00* (2013.01); *B33Y 30/00* (2014.12); *B33Y 40/00* (2014.12); *B33Y 50/02* (2014.12); *B33Y 70/00* (2014.12); *B33Y 80/00* (2014.12); *Y10T 428/24802* (2015.01)

(58) Field of Classification Search
None
See application file for complete search history.

(56) References Cited

U.S. PATENT DOCUMENTS

| | | |
|---|---|---|
| 6,177,034 B1 | 1/2001 | Ferrone |
| 2010/0191360 A1 | 7/2010 | Napadensky et al. |
| 2013/0095302 A1* | 4/2013 | Pettis ............... B29C 64/20 428/195.1 |

(Continued)

OTHER PUBLICATIONS

USPTO, "U.S. Appl. No. 15/006,011 Notice of Allowance dated Mar. 8, 2018", 10 pages.

(Continued)

*Primary Examiner* — Christopher M Polley
(74) *Attorney, Agent, or Firm* — Strategic Patents, P.C.

(57) ABSTRACT

An article of manufacture formed by a three-dimensional printing process that uses multiple build materials with different optical properties (e.g., color, opacity, and the like) at different surface depths to achieve grayscale-rendered images on exterior surfaces thereof.

20 Claims, 10 Drawing Sheets

(56) References Cited

U.S. PATENT DOCUMENTS

2016/0136901 A1   5/2016  Pettis et al.
2016/0262442 A1*  9/2016  Davila ............... H04N 1/00411
2016/0278426 A1*  9/2016  Davila ................ A21C 15/002

OTHER PUBLICATIONS

USPTO, "U.S. Appl. No. 13/478,233, Final Office Action dated Sep. 3, 2015", 6 pages.
USPTO, "U.S. Appl. No. 13/478,233, Non-Final Office Action dated Apr. 24, 2015", 6 pages.
USPTO, "U.S. Appl. No. 13/478,233, Notice of Allowance dated Nov. 13, 2015", 5 pages.

* cited by examiner

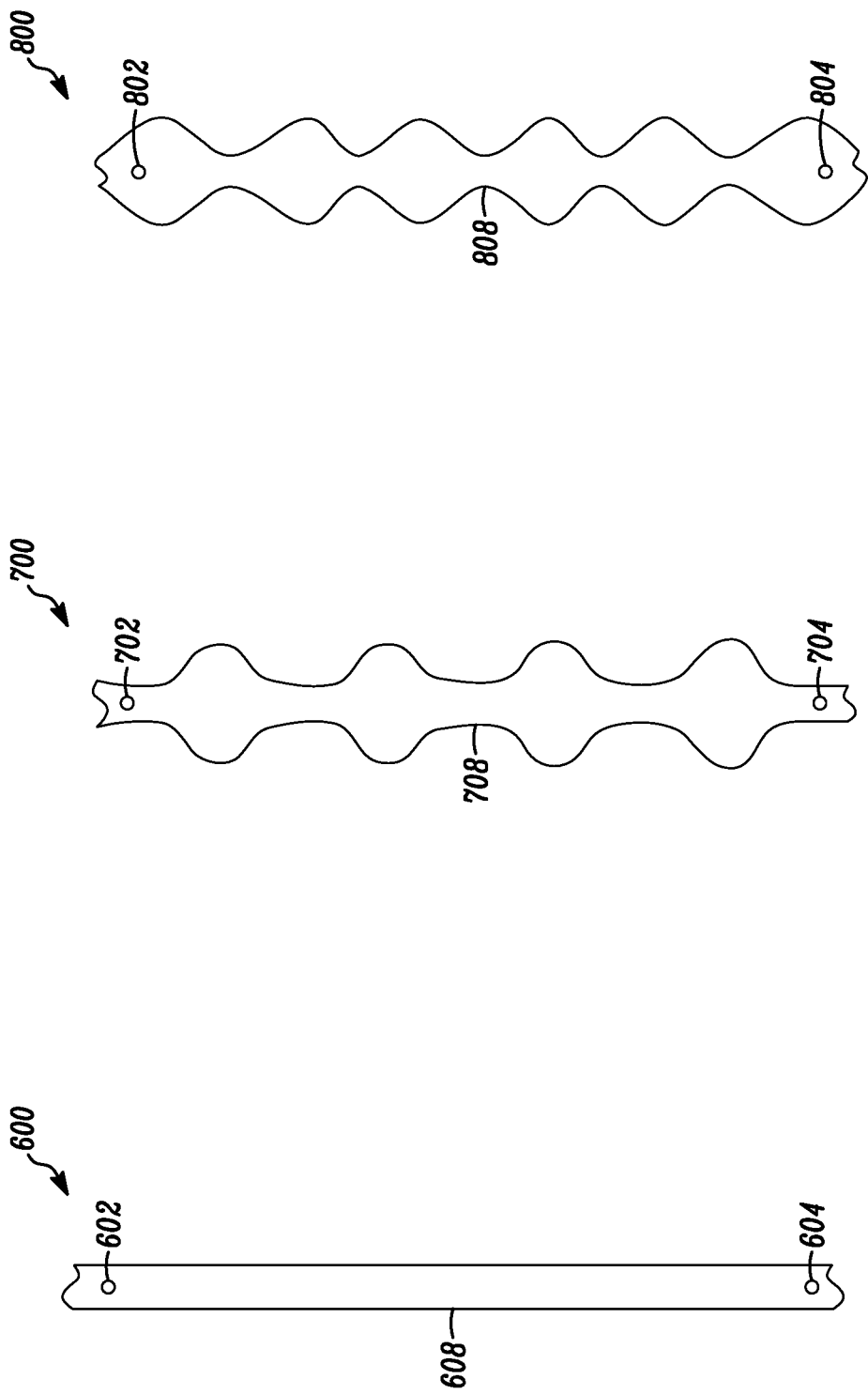

GRAYSCALE RENDERING IN 3D PRINTING

RELATED APPLICATIONS

This application is a continuation of U.S. application Ser. No. 15/006,011 filed on Jan. 25, 2016, which is a continuation of U.S. application Ser. No. 13/478,233 filed on May 23, 2012, which claims the benefit of U.S. Prov. App. No. 61/547,132 filed on Oct. 14, 2011, where the entire content of each of these applications is incorporated herein by reference.

BACKGROUND

In an additive three-dimensional fabrication system, a physical object can be realized from a digital model by depositing successive layers of a build material that accumulate to provide the desired form.

There remains a need for techniques to render of grayscale images on exterior surfaces of printed three-dimensional objects.

SUMMARY

An additive three-dimensional fabrication process uses multiple build materials with different optical properties (e.g., color, opacity) at different surface depths to achieve grayscale-rendered images on exterior surfaces thereof.

BRIEF DESCRIPTION OF THE FIGURES

The invention and the following detailed description of certain embodiments thereof may be understood by reference to the following figures:

FIG. 6 shows an extrusion of a build material.

FIG. 7 shows an extrusion of a build material.

FIG. 8 shows an extrusion of a build material.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

Figure 1:
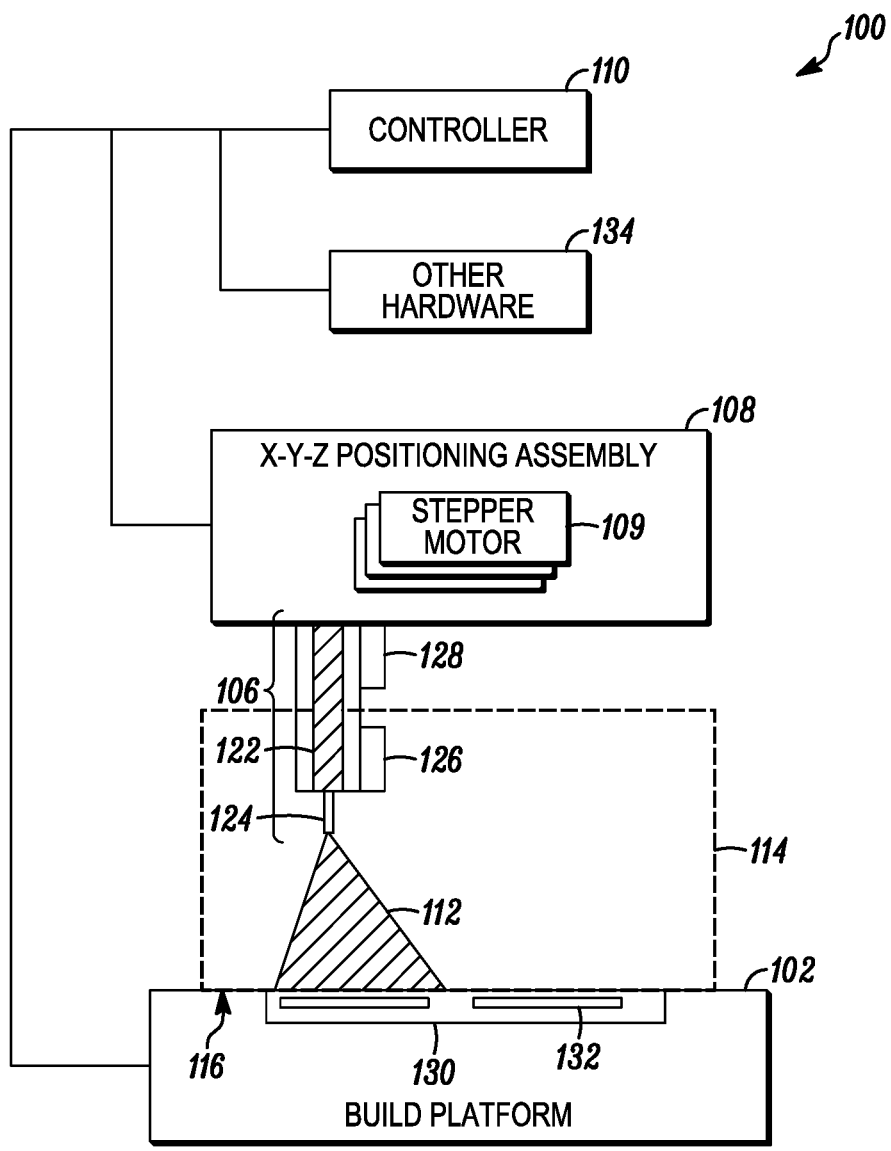
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by worm gears so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

In general, the above system can build a three-dimensional object by depositing lines of build material in successive layers—two-dimensional patterns derived from the cross-sections of the three-dimensional object. As described below, a deposition rate during this process may be varied using a variety of techniques to impart a surface texture or other structures or features to outside surfaces of the three-dimensional object. The following description begins with a generalized software architecture for three-dimensional fabrication using the systems described above, and continues with specific methods for varying a deposition rate to achieve a non-uniform surface texture or other surface feature during fabrication of an exterior surface of the three-dimensional object.

It will be understood that all surfaces are non-uniform in some sense, and that any fabrication process has physical limitations that lead to variations or non-uniformities in fabricated objects. The phrase "non-uniform surface texture" as used herein is intended to refer to those patterns, features, or structures that depart from ordinary process variations achieved in a "uniform surface texture" obtained from a constant-deposition-rate fabrication process that assumes a non-varying volumetric delivery rate for build material. By varying the volumetric rate of delivery of build material to deposit more or less build material at a given location than otherwise would have been deposited, intentional irregularities can be obtained, and more specifically controlled, to provide sub-pixel features or surface textures. Thus, non-uniform surface textures or features may be identified as those features smaller than a nominal processing resolution of a fabrication system, but larger than features or characteristics resulting from random or otherwise uncontrolled process variability. In the context of three-dimensional fabrication as contemplated herein, sub-pixel features may similarly be understood to be any features processed or reproduced in x-y increments within the plane of a build platform smaller than the nominal step size of the fabrication system, or otherwise smaller than the smallest discretely addressable position intervals of the fabrication system, particularly in the x-y plane.

Non-uniform features as generally contemplated herein may be used to apply a desired surface texture to a three-dimensional object. In other aspects, such non-uniform features may be used to control other aspects of an object, such as a coefficient of friction on the surface of the object or light transmission through the object.

In one aspect, this capability may be applied, e.g., on an angled surface, to achieve surfaces that are more uniform or planar than would be obtained in the "uniform" surface of an unmodified process. Thus the term "non-uniform" as used herein may be best understood in certain circumstances to mean "including features smaller than the nominal processing resolution of a fabrication system," which features are readily structurally identifiable to one of ordinary skill in the art.

Figure 2:
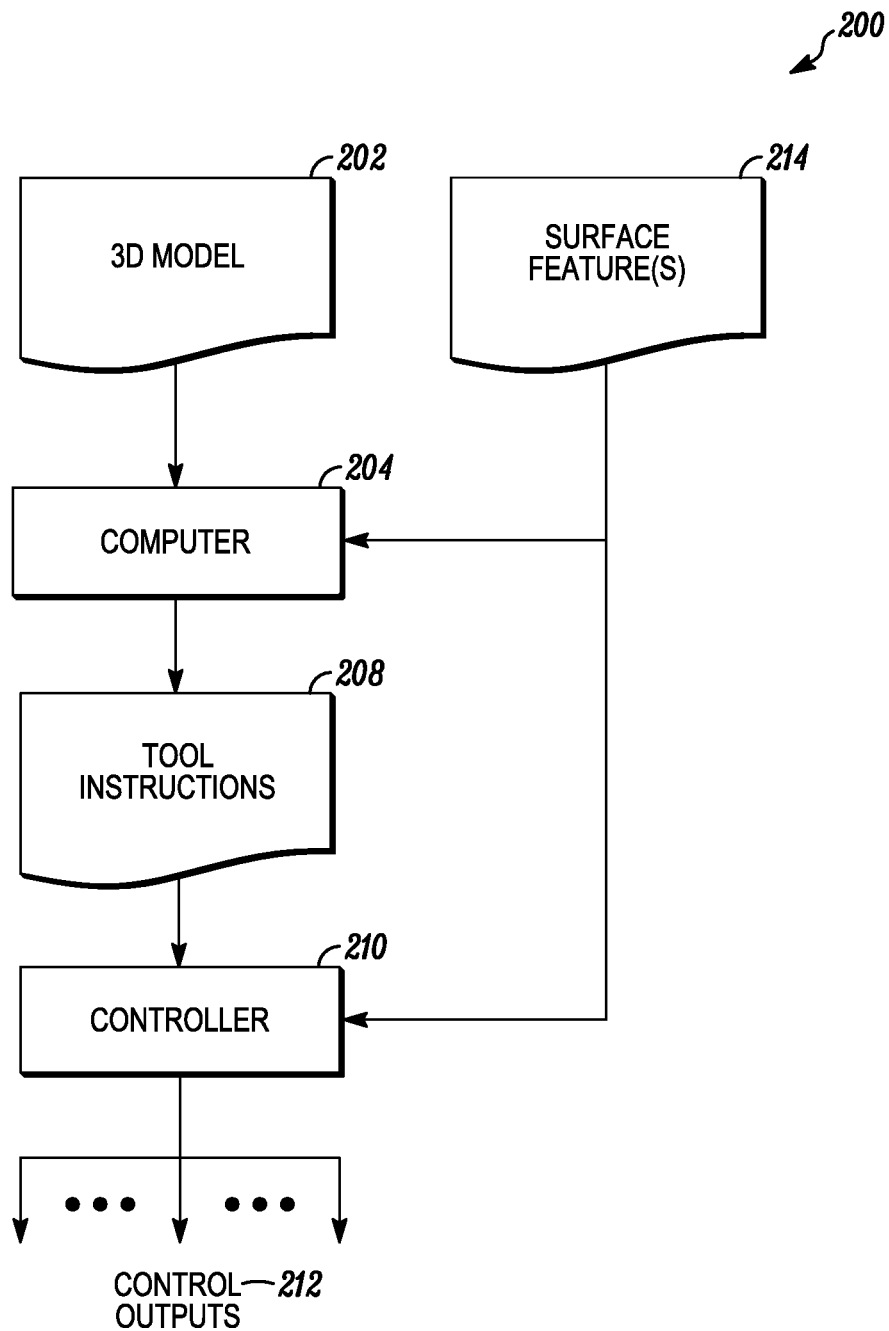
FIG. 2 is a block diagram of a controller architecture for a three-dimensional printer.

FIG. 2 is a block diagram of a controller architecture for a three-dimensional printer. In general, a three-dimensional model is converted into a sequence of tool instructions, typically including a line model that can be sent to a controller for execution on a fabrication platform such as that described above.

A model 202 of an object such as any of the three-dimensional objects 112 described above may be stored as a computer-aided design (CAD) model or other three-dimensional representation using any proprietary or non-proprietary software format. The model may, for example, include a wireframe representation, solid modeling representation, surface modeling representation, point cloud, or the like. Numerous data formats and three-dimensional modeling tools are known in the art, any of which may be suitably adapted to use for creating and storing the model 202.

The model may be provided to a computer 204, which may be any general purpose or special purpose computing device including, e.g., a processor, memory, and one or more data or network interfaces or other input/output ports. This may include processing circuitry on a printer and/or a separate computer or any combination of these. The computer 204 may convert the model 202 in accordance with computer code running on the computer 204 to obtain a representation of the model 202 suitable for fabrication. In one aspect, this may include multiple steps such as conversion to a standard format such as the widely used stereolithography (STL) file format created by 3D Systems. The model 202, or the standard format representation of the model 202, may be further processed to obtain tool instructions 208 for a controller 210 such as the controller 110 described above. In one aspect, the tool instructions 208 may include G-code or any other computer numerical control (CNC) programming language or other description suitable for execution by the controller 210. In one aspect, G-code or other similar tool instructions include a tool path that characterizes a physical path in three-dimensional space traversed by a tool such as the x-y-z positioning assembly 108 and extruder 106 described above. A tool may extrude material while traversing a portion of the tool path in order to form a physical object. The tool instructions 208 may represent this tool path as a sequence of directions, a sequence of locations, a sequence of starting and ending locations, or any other suitable representation. However formulated, the tool instructions 208 may be transmitted to the controller 210 for execution.

The controller 210, which may receive the tool instructions 208 as a stream of instructions or as a file for local execution or in any other suitable form, may interpret the tool instructions 208 and generate control outputs 212 directing the various aspects of a fabrication system such as the printer 100 described above to produce a physical realization of the object described in the model 202. The control outputs 212 may include analog control outputs, digital control outputs, or the like.

The model 202 may include, or may be processed to derive, one or more surface features 214 of the object, or a user may specify such surface features 214 independently from the object described by the model 202. However derived, these surface features 214 may be used by the computer 204 in preparing tool instructions 208. This may include incorporating the surface features 214 into the line model or tool path where appropriate, or creating metadata for the tool instructions 208 so that the controller 210 can apply the surface features 214 consistent with its own capabilities. In another aspect, the surface features 214 may be sent directly to the controller 210 for handling independent of the tool instructions 208. As discussed above, features within the processing resolution of the printer 100 (including the controller 210) may simply be incorporated into the tool instructions 208 for execution by the controller 210. However, features below the processing resolution (which may be measured using any suitable metric such as a minimum feature dimension, a minimum tool path step, a minimum volume of build material, a minimum x-y resolution, and so forth) may still be reproduced by the fabrication platform using the techniques discussed herein. In particular, the controller 210 may identify surfaces of the model 202, identify one or more corresponding surface features 214 (which may be location dependent or location independent), and modify the tool instructions 208 during fabrication to obtain the desired surface features 214 on a physical model fabricated from the model 202.

The surface features 214 may include any of a variety of structures, features, or the like. In one aspect, the surface features 214 may provide a general description of surface texture such as smooth, rough, wavy, undulating, and so forth, along with an identification of where on a surface of the object the surface feature appears. The surface feature 214 may be physically modeled as a bit map or voxel representation, or as a more general representation that can be scaled, rotated, or otherwise modified to achieve a desired feature or texture. In one aspect, a variety of surface textures or features may be provided for selection and placement by a user. More generally, a variety of types of surface features 214, and representations of same, may be suitably adapted to the uses contemplated herein. In some embodiments, the tool instructions may include information allowing for later calculation of surface features by a controller. This information may, without limitation, include surface identifiers relating lines in a tool path to surfaces in the model 202, such as exterior surfaces, interior surfaces, and so on. The information may also or instead include texture identifiers that identify surface features with reference to base textures, texture models, texturing parameters (magnitude, rotation, scaling, etc.). This information may further include data used in texture mapping the base textures to the surfaces (e.g., data for registering/orienting the texture map to the surface, and so on). In embodiments, the texture maps may include two-dimensional texture maps, three-dimensional texture maps, tessellations, smoothing or anti-aliasing patterns/filters, and so on.

It will be understood that, while FIG. 2 depicts surface textures as data external to a model, the surface texture may be included within object data for the model, or may be inferred from the model itself, all without departing from the scope of this disclosure. Regardless of how or where obtained, the surface feature 214 may be realized in a physical object fabricated by a three-dimensional printer or the like.

When surface texture information is available, either within the tool instructions or independent of the tool instructions, the controller 210 may adjust or adapt the tool instructions accordingly to achieve the intended surface texture, such as by including an instruction to decrease or increase a feed rate for build material or a temperature of a heating chamber, or by moving a deposition tool such as the extruder 106 described above within a z axis to vary the rate at which build material is deposited. It should be appreciated that the terms computer 204 and controller 210 may refer to separate processing devices such as a computer coupled to a printer and an on-board processor of a printer, however this architecture is not required, and various steps described herein may suitably be performed by one or the other of these devices, or some combination of these and/or any other processors or other processing circuitry. Thus, while it is generally true that a fabrication process can logically be divided into steps performed prior to physical fabrication and steps performed during physical fabrication, no specific allocation of specific hardware to specific steps is intended by the foregoing description.

Logic for calculating the variations in a deposition rate during a fabrication process may be implemented in firmware, software, hardware, or the like on the controller 210. Thus while the controller 210 may generally operate to extrude a build material at a constant deposition rate (or volumetric flow rate) while moving an extruder in an x-y pattern according to the tool instructions 208 from the computer 204, the controller 210 may also reference surface features 214 to additionally determine when and where to vary from a predetermined, constant deposition rate in the tool instructions 208. These variations in deposition rate during the build process may be applied to obtain variations in the surface texture to obtain a physical realization of the model 202 that includes the surface features 214. Thus in one aspect, the fabrication of surface textures or other surface features as contemplated herein may be readily recognized by the addition or modification of controller instructions to interpolate, filter, vary, or otherwise modify tool instructions for a constant-deposition-rate fabrication process.

In another aspect, these and similar techniques may be applied to achieve sub-pixel resolution in a fabrication process. For example, a tool path in the tool instructions 208 may be represented as a straight line. Where this line is angled to an x-y coordinate system used to control a tool such as an extruder, the deposition rate may be varied to partially fill step discontinuities between discrete, adjacent x or y coordinates within the tool path. A variety of sub-pixel processing and rendering techniques are known in the art of two-dimensional printing such as interpolation, anti-aliasing, and low-pass filtering, many of which may be readily adapted to use with the systems and methods described herein.

Figure 3:
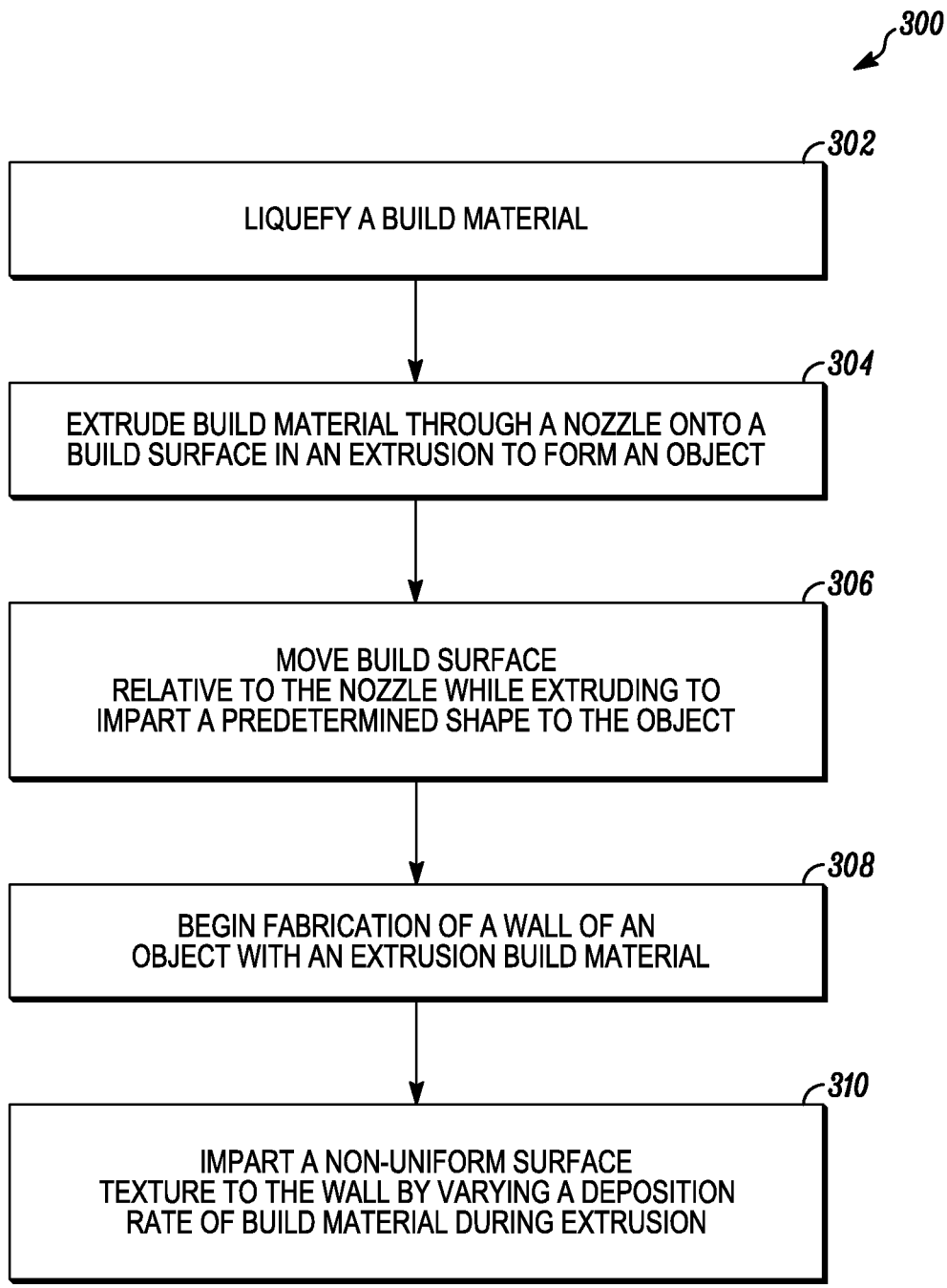
FIG. 3 is a flowchart of a process for imparting surface texture to a three-dimensional object.

FIG. 3 is a flow chart of a process for imparting surface texture to a three-dimensional object. In general, a three-dimensional object may be fabricating using the printer 100 described above or any similar system. During this process, modifications may be implemented as described below to impose a desired, predetermined surface texture on an object during fabrication.

As shown in step 302, the process 300 may begin with liquefying a build material. This may be any liquefiable material such as a thermoplastic or the like. It will be understood that some useful build materials do not require liquefication, and may be curable or otherwise treatable after extrusion to achieve desired structural and/or aesthetic properties. Thus this step is optional, and depends upon the type of build material being used in a three-dimensional fabrication process.

As shown in step 304, the liquefied build material may be extruded through a nozzle of an extruder onto a build surface in an extrusion to form an object. This may be a liquefied build material, or any other suitable build material as noted above.

As shown in step 306, the build surface may be moved relative to the extruder (or nozzle thereof) during the extrusion as generally described above to impart a predetermined shape, such as from a computer model or the like, to the object.

As shown in step 308, the process 300 may include fabricating a wall or other portion of the object such as an exterior surface with the extrusion of the build material. This may include fabrication using any of the techniques described above. It will be understood that the wall may be detected as an exterior surface using a variety of techniques. For example, numerous algorithms are known for identifying surfaces of volumetric models, any of which may be applied to identify exterior walls automatically. An exterior wall may also or instead be explicitly labeled in the surface feature data, so that a controller can detect the exterior surface with a flag or the like within the tool instructions. In this aspect, it will be understood that manual identification of "exterior" walls may also be used to flag interior walls or structures where greater control of extrusion is desired.

While the description herein focuses on the texture or shape of surface features imposed on an object, it will be appreciated that the improved control provided by the techniques disclosed herein may be applied to obtain other benefits. For example, by varying the thickness of an exterior wall, the light-transmissive properties may be controlled to achieve desirable aesthetic qualities such as by embedding patterns or designs in an exterior wall that are visible when the exterior wall is backlit. This technique may be applied to fabricate, e.g., an ornamental lamp shade or similar device with a light-transmissive design.

As shown in step 310, the process 300 may include varying a deposition rate of build material during extrusion to impart a non-uniform surface texture to the exterior wall. As generally described above, the non-uniform surface texture may be a predetermined surface texture having one or more sub-pixel features relative to the process used for fabrication.

It will be understood that the deposition rate may be varied using a number of different techniques. For example, in one aspect a build material feed rate may be varied by controlling the speed of a drive motor or similar mechanism that supplies a filament of build material to an extruder. As the feed rate or motor speed is increased, the deposition rate will increase, and as the feed rate (or motor speed) is decreased, the deposition rate will decrease. This approach in particular permits extended periods of increase or decrease without requiring an offsetting, opposing action to return to the constant deposition rate. By contrast, other techniques such as increasing temperature (where materials and thermal control permit) or temporarily changing a z-axis position of the extruder or build platform, would generally require a complementary, offsetting parameter change to return the system to a normal, constant-deposition-rate process. This limitation is mitigated where the change in deposition rate is periodic in nature. That is, where the variation in deposition rate is sinusoidal or otherwise varies in a manner for which the rate of deposition integrates to the constant rate (or stated differently, with zero net change in deposition rate), the need to actively recover the constant deposition rate (e.g., by a complementary, opposing step in z-axis position) may be mitigated or eliminated.

In another aspect, temperature of a heater or the like may similarly be varied. By increasing the heat applied to a liquefiable material such as a thermoplastic, the rate of deposition may be increased as the less viscous material flows more quickly from an extruder. Similarly, a decrease in heat may slow the extrusion of material. As noted above, such variations may be periodic in nature to avoid processing difficulties from an otherwise constant feed supply rate such as overfilling a melting chamber or underfilling to cause a discontinuity in the supply of build material. As another example, the z-axis position may be temporarily increased or decreased where the system allows, to cause an increase in the deposition rate (as an extruder moves closer to a build platform) or a decrease in the deposition rate (as the extruder moves away from the build platform). In yet another aspect, the rate of x-y movement or horizontal velocity of the build platform relative to the extruder may be varied to achieve changes in deposition rate under control of the controller.

It will readily be appreciated that two or more parameters (e.g., temperature and feed rate) may be varied concurrently to control the deposition rate of a build material. Additionally, it will be understood that certain controls may exhibit a significant latency. So, for example, increasing the temperature may be limited by thermal capacitance of the heating components, and there may be a significant lag (relative to a time step used by the controller) before the change in temperature yields a change in deposition rate. Such latency may be determined empirically or experimentally, or estimated using physical or statistical modeling, or otherwise determined so that the controller issues instructions to the extruder and/or build platform in a manner suitably synchronized to the fabrication process to obtain surface features at the desired location(s) on the surface of an object.

As noted above, the surface texture may be specified in numerous ways. This may include sub-pixel interpolation of a computer model as noted above. This may also or instead include use of pre-defined surface textures based upon, e.g., sinusoidal functions, step functions, triangle functions, square functions, and so forth. In addition to describing such surface textures in a particular two-dimensional layer of a build, a surface texture may define an offset or the like from layer to layer so that a periodic or other variation can be shifted in the x-y plane with successive z-axis steps. Thus the surface texture may include two-dimensional features that are aligned, misaligned, staggered or otherwise arranged from layer to layer. Similarly, the surface texture may apply different patterns or functions in each two-dimensional layer to achieve a desired surface texturing effect.

More generally, varying the deposition rate may include any and all techniques for varying how much material is deposited in a particular area. Thus, the phrase "varying the deposition rate" as used herein is intended to include literally varying the rate at which build material exits the extruder, as well as other variations causing a change in the time wise amount of material deposited on an object such as a change in the velocity of an extrusion head relative to a build platform, as well as any combination of the these or other controllable parameters that affect the quantity of material deposited in a particular area over a particular period of time.

Figure 4:
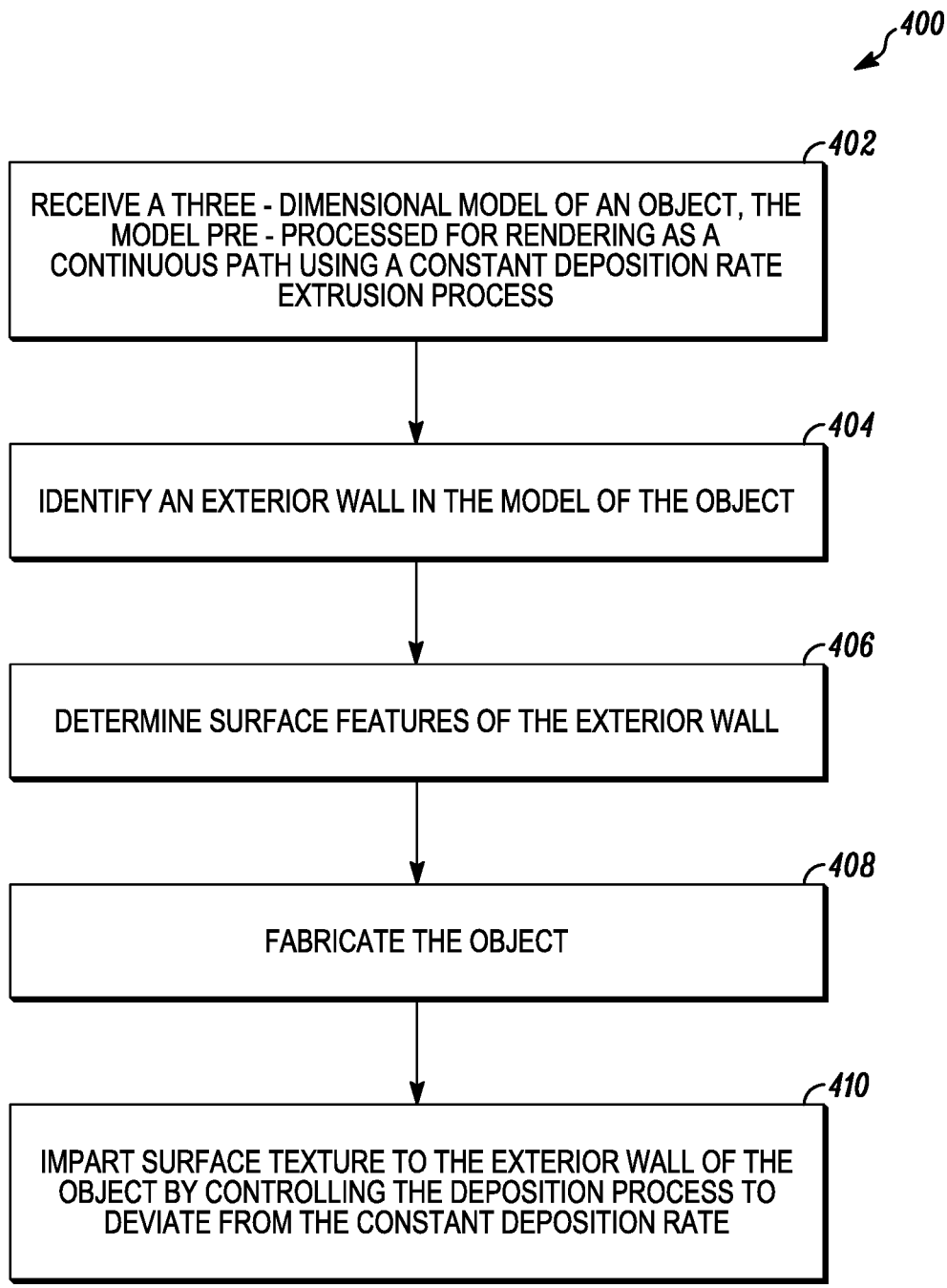
FIG. 4 is a flowchart of a process for fabricating an object with sub-pixel surface features.

FIG. 4 is a flowchart of a process for fabricating an object with sub-pixel surface features.

As shown in step 402, the process 400 may begin with receiving a three-dimensional model of an object that has been pre-processed for rendering as a continuous path in an extrusion process that uses a constant deposition rate. This may, for example, include the creation of tool instructions from a digital model as generally described above, including without limitation a tool path followed by an extruder while depositing material to build the object. In general, pre-processing in this manner includes selecting a number of operating parameters such as feed rate, temperature, x and y step sizes, and the like, which may be selected explicitly through a user interface, or implicitly by software supporting a fabrication system, and calculating a path through a series of two-dimensional layers that can be used to fabricate the object. The details of tool path creation are well known in the art and embodied in software and fabrication systems that are commercially available, and as such, the details of generating tool instructions are not set forth in detail here.

As shown in step 404, the process 400 may include identifying an exterior wall in the three-dimensional model of the object. As noted above, this may include any suitable automated or manual process or combination of these, and may for example include identifying non-exterior walls as exterior walls for purposes of sub-pixel feature fabrication. The phrase "exterior wall" as used herein should be understood to include all such regions of the model and/or object fabricated from the model.

As shown in step 406, the process may include determining surface features of the exterior wall. This may include identifying small (e.g., sub-pixel) features from a digital model that are not captured in a tool path, such as surface details or an interpolation of lines or other geometric features from the digital model. This may also or instead include a selection of a generalized surface texture for a region of the exterior wall as described above. It will be understood that in certain circumstances, the surface features may include features larger than a nominal x-y processing resolution of a fabrication system, that is, capable of reproduction without independent control of a deposition rate as described herein. Nonetheless, such surface features may be usefully modeled and fabricated as a characteristic independent of the digital model.

As shown in step 408, a three-dimensional fabrication system may fabricate the object of the digital model using a tool path and/or other tool instructions.

As shown in step 410, during the fabrication of step 408, a surface texture may be imparted to the exterior wall of the object by controlling the deposition process to deviate from the constant deposition rate. Stated differently, the deposition rate may vary in response to surface features detected by the controller during deposition, which variations may be independent of a tool path dictated by a source digital model. Such variations may in general be represented in a variety of forms, and may be realized using a variety of techniques, all as discussed above.

This may, for example, include elements or features smaller than a resolution of the deposition process, such as an x-y resolution or other nominal step size or controlled increment of fabrication. This may also or instead include an overall surface texture for the exterior wall based upon a mathematical model (e.g., sinusoid, triangle wave, etc.), bitmapped surface, or any other source.

Figure 5:
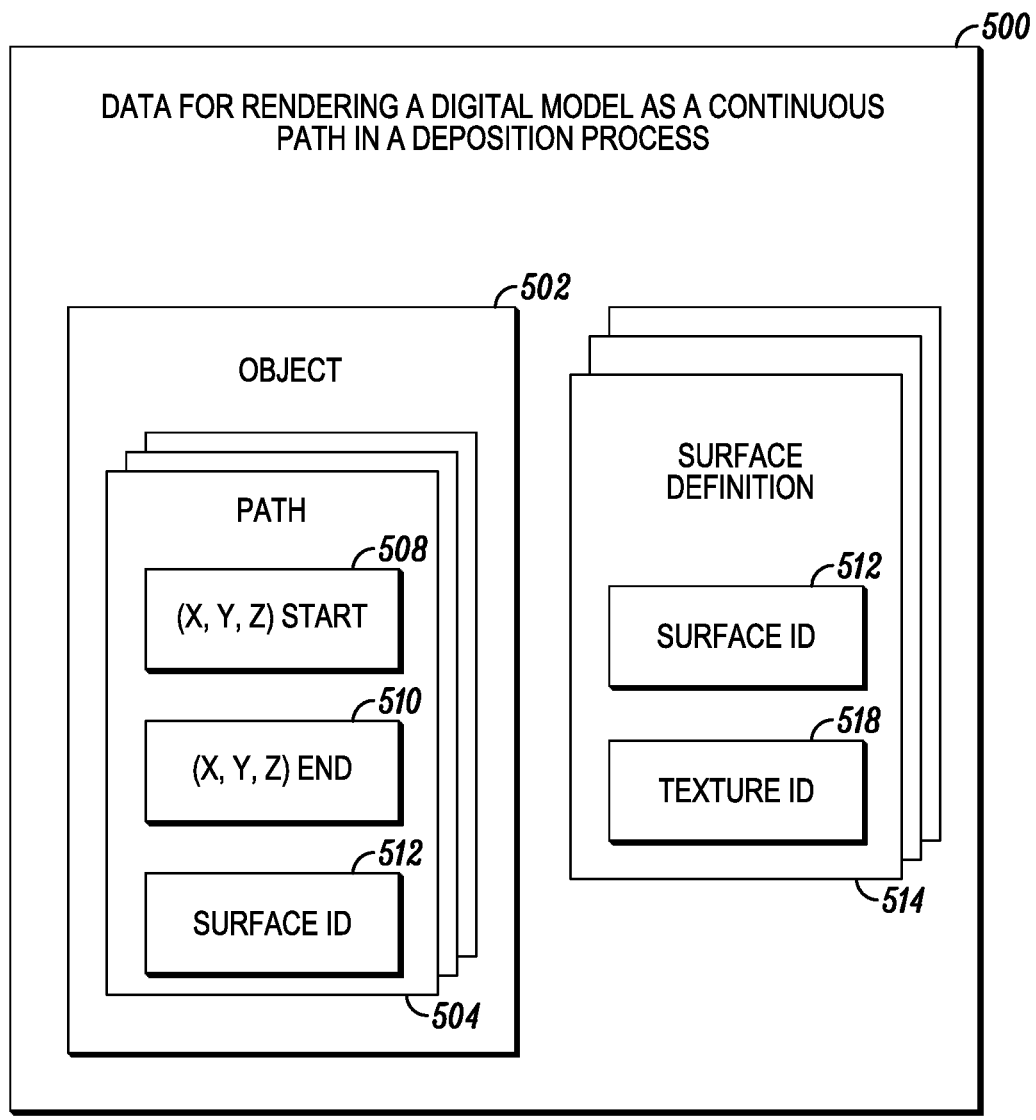
FIG. 5 is a block diagram of a data structure describing an object for three-dimensional fabrication.

FIG. 5 is a block diagram of a data structure describing an object for three-dimensional fabrication. In general, the data structure 500 may include a description of an object 502 that has been pre-processed for rendering as a continuous path in a deposition process based upon, e.g., an extrusion at a constant deposition rate, along with a surface definition 514 of one or more surface features for the object 502.

The description of the object 502 may include any of a variety of tool instructions that specify parameters such as temperature, feed motor speed, and any other controllable parameters for a fabrication platform such as the printer 100 described above. The instructions may more particularly include a tool path 504 including a number of start 508 and end 510 coordinates in x-y-z space that characterize a path traversed by a tool such as an extruder during fabrication of the object. Typically, the z coordinate remains constant while a two-dimensional line is rendered in the x-y plane, however, any combination or sequence of coordinates within the processing capability of the fabrication platform may be used to define a tool path for rendering an object as contemplated herein. Techniques are well known in the art for converting a three-dimensional object model into a tool path that includes sequential layers of two-dimensional patterns, and software (either proprietary or non-proprietary) is commercially available for performing this function. As such, the details of a conversion from a digital model to a tool path are not described in detail here.

In addition, the description of the object 502 may include a surface identifier 512 or other metadata that flags a particular line or line segment in the tool path 504 as belonging to an exterior wall. It should be noted that this data is optional. Rather than explicitly labeling surfaces, exterior surfaces and the like may be inferred by a controller that receives the description of the object 502 based on, e.g., analysis of the tool path 504 or a comparison of the tool path 504 to an original digital model from which the tool path 504 was obtained.

The surface definition 514 may define surface features or surface texture in any suitable manner. For example, the surface definition 514 may be indexed to the surface identifier 512 of the description of the object 502 so that textures or features can be retrieved and applied on a segment-by-segment basis along the tool path 504. The texture identifier 518 may include a reference to a texture description, such as a mathematical or physical (e.g., bitmapped) representation of a texture, or to one or more tool instructions that vary a deposition rate to achieve a desired feature or texture. In another aspect, the surface definition 514 may be omitted as an explicit description of surface features or textures, and a controller or the like processing the tool path 504 may instead compare the tool path 504 to a source digital model of the object to determine whether and where a deposition rate might be varied to conform the fabrication process to features of the digital model. It will further be appreciated that both of these techniques may be applied in combination, either concurrently or sequentially, without departing from the scope of this disclosure.

Having described systems, methods, and data structures for surface texturing and other sub-pixel rendering techniques in three-dimensional fabrication, a number of examples are now provided of extrusions obtained using these techniques. It will be understood that the drawings of extrusions in the following figures are provided by way of example and for purposes of illustration. These drawings do not limit the scope of this disclosure to any particular relative or absolute dimensions or to any specific features or patterns of extrusion that might be obtained by varying a deposition rate as contemplated herein.

FIG. 6 shows an extrusion of a build material. The build material may be any of the materials described above. The extrusion 600 in FIG. 6 is rendered along a straight line of a tool path from a first point 602 to a second point 604 in an x-y plane. The extrusion 600 is rendered without any modification to tool instructions and as such provides a surface 608 that is substantially straight.

FIG. 7 shows an extrusion of a build material. The extrusion 700 is rendered along a straight line of a tool path from a first point 702 to a second point 704. During the extrusion, the deposition rate may be varied according to, e.g., a periodic square wave or similar step function of any desired duty cycle to obtain a surface 708 that includes periodic protrusions. As noted above, these protrusions may be staggered from layer to layer of a fabrication process so that corresponding ridges are oriented diagonally along a surface of a completed object.

FIG. 8 shows an extrusion of a build material. The extrusion 800 is rendered along a straight line of a tool path from a first point 802 to a second point 804. During extrusion, the deposition rate may be varied according to, e.g., a periodic function such as a sinusoid or triangle wave to obtain a surface 808 that is substantially sinusoidal in shape.

Figure 9:
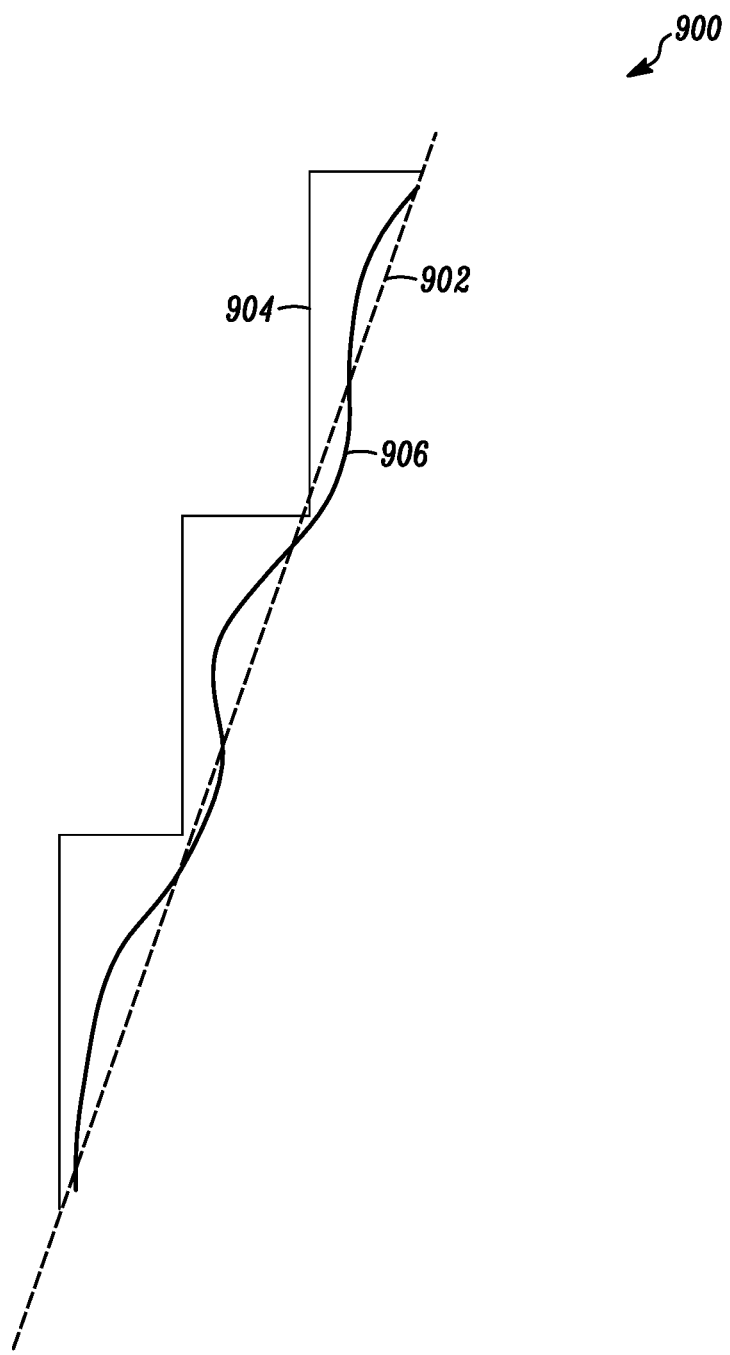
FIG. 9 depicts an exterior surface of an object fabricated from a digital model using a varying deposition rate.

FIG. 9 depicts an exterior surface 900 of an object fabricated from a digital model using a varying deposition rate. The digital model of the exterior surface 900 may have a surface 902 angled to a rectilinear coordinate system of a fabrication platform such as the printer 100 described above. The physical model rendered by a conventional extrusion process with x-y control may have a corresponding surface 904 with a number of straight line segments oriented to the x-y coordinate system of the extruder, resulting in a stair step surface. By varying the deposition rate using, e.g., the techniques described above, a physical model of the exterior wall may be fabricated with a modified surface 906 that more closely matches the digital model. It will be appreciated the modified surface 906 is provided by way of example, and that the actual contours of the modified surface 906 may vary according to the capability of a varying deposition rate process to achieve particular surface features. It will further be appreciated that an interior surface of the physical model may depart significantly from the contours of the digital model, the simple x-y version of the digital model, and the modified surface 906 of the exterior surface 900.

The foregoing techniques may be employed to apply surface texture independent of a digital model, or to render sub-pixel surface features as generally described above. It will be appreciated that modifications of deposition rate (e.g., by a controller to a set of tool instructions for fabricating an object from a digital model) may similarly be applied to a wide array of aesthetic and structural design techniques. For example, these techniques may be applied to vary wall thickness and provide different light transmission properties within a wall of an object. These techniques may also or instead be used to control infill within a closed object in order to reduce weight or increase structural support. These techniques may also or instead be applied to buttress, fillet, or otherwise add internal and/or external structural features to reinforce an object or portions thereof, or similarly to reduce material deposition to reduce rigidity and provide increased compliance at desired locations within an object. All such variations as would be apparent to one of ordinary skill in the art are intended to fall within the scope of this disclosure.

While certain fabrication techniques offer greater z-axis (e.g., by height or layer) resolution than x-axis or y-axis resolution, grayscale imaging may nonetheless be achieved with satisfactory results, and may be improved in vertical walls using various techniques, such as the sub-pixel resolution techniques described above.

Figure 10:
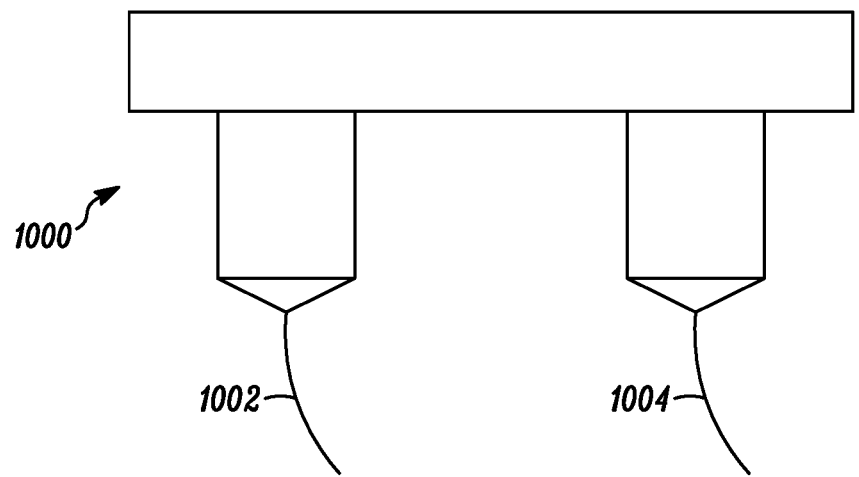
FIG. 10 shows a multi-extruder.

FIG. 10 shows a multi-extruder. The details of multi-material three-dimensional printing are addressed elsewhere. In particular, it will be noted that the extruder 1000 can extrude two different materials for a three-dimensional build—a first material 1002 that is black and opaque, and a second material 1004 that is generally pigment free or white, and at least partially translucent so that visible light can pass through. While black and white materials are suitable for grayscale imaging as contemplated herein, it will be readily appreciated that other colors may also or instead by employed to more generally achieve various monochrome or multicolor visual effects on exterior surfaces.

Figure 11:
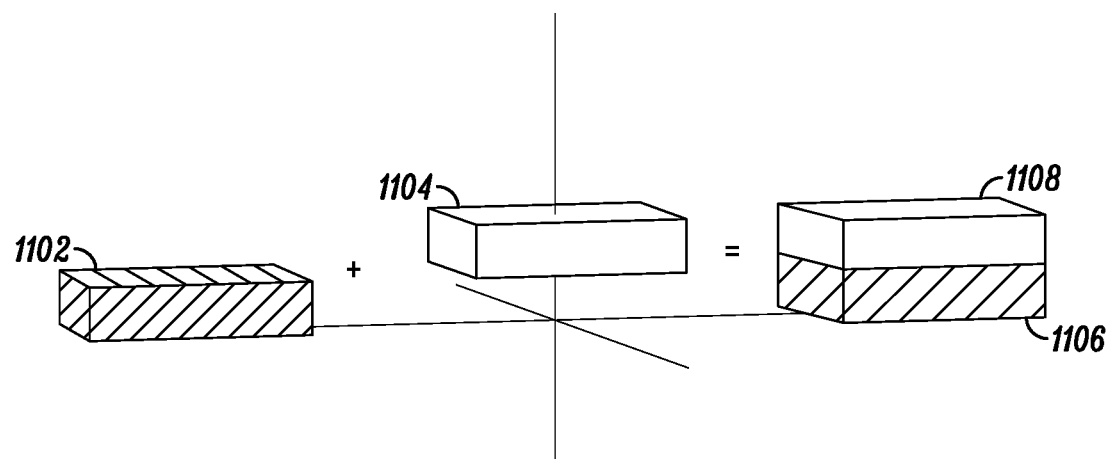
FIG. 11 shows a basic fabrication building block for achieving grayscale affects.

FIG. 11 shows a basic fabrication building block for achieving grayscale affects. A first layer of opaque material 1102, when printed or otherwise fabricated beneath a second layer of translucent material 1104, the resulting structure 1106 may yield a partial tone, grayscale affect when viewed from an illuminated exterior 1108. Of course, the actual rendered color/tone will depend on the optical properties of the opaque material and the translucent material, including without limitation the opacity, the color, the absorption, and so forth. Thus while the term 'opaque' is generally used to refer to a substrate and the term 'translucent' is generally used to refer to an overlay, these terms are not intended to require specific optical properties but rather to suggest the general function of these two materials in achieving a grayscale image on an exterior surface.

Figure 12:
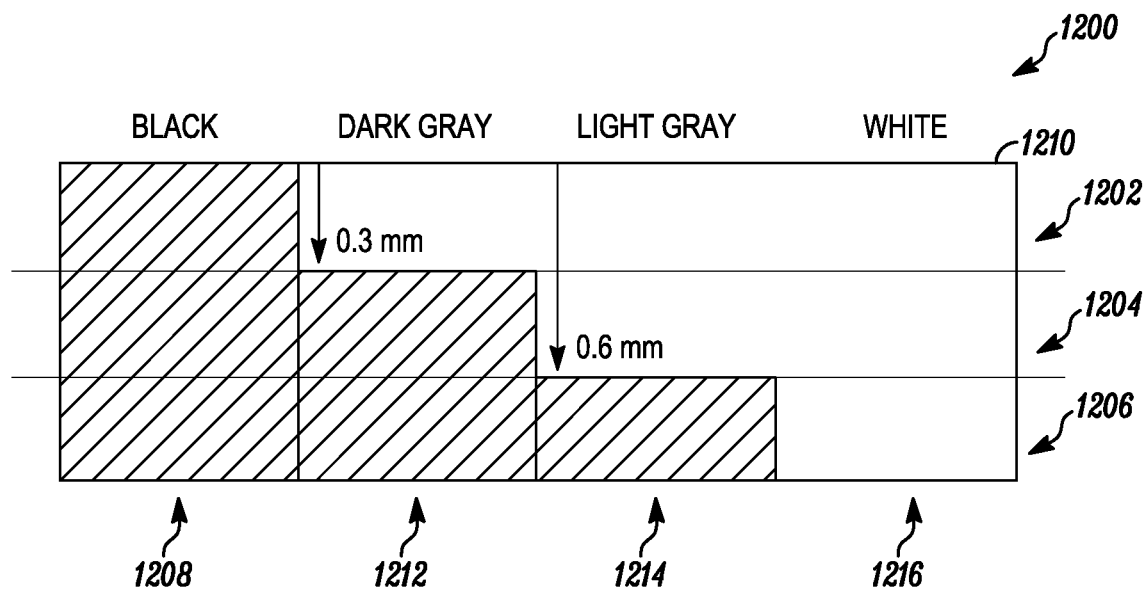
FIG. 12 depicts a multilayer structure and corresponding grayscale exterior surface effects.

FIG. 12 depicts a multilayer structure and corresponding grayscale exterior surface effects. In general, the structure 1200 includes a first layer 1202, a second layer 1204, and a third layer 1206, each of which may be optionally filled with either or both of an opaque material and a translucent material. Each layer may have a thickness of about 0.3 mm, although any other depth or depths consistent with a particular fabrication process and suitable for grayscale rendering may also or instead be employed.

In a first region 1208, every layer may be fabricated from an opaque material, so that the exterior surface 1210 appears black (or alternatively, a color of the opaque build material). It will further be understood that layers below the surface layer may also or instead be fabricated from the translucent material, or any other suitable material, without affecting the surface properties of the opaque layer. In a second region 1212, the first layer 1202 may be fabricated from a translucent material, while the second layer 1204 and the third layer 1206 are fabricated from an opaque material. In this second region 1212, the exterior surface 1210 may have a dark gray color. In a third region 1214, the first layer 1202 and the second layer 1204 may be fabricated from the translucent material, and the third layer 1206 may be fabricated from the opaque material, thus imparting a light gray color to the exterior surface 1210. In a fourth region 1216, all of the layers may be fabricated from the translucent material, so that the exterior surface 1210 has a white color.

It will be appreciated that the terms black, dark gray, light gray, and white are relative in nature, and are intended to refer generally to degrees of darkness, which may vary significantly in absolute terms according to the optical properties of the materials used, rather than strict locations on a grayscale or color curve.

Figure 13:
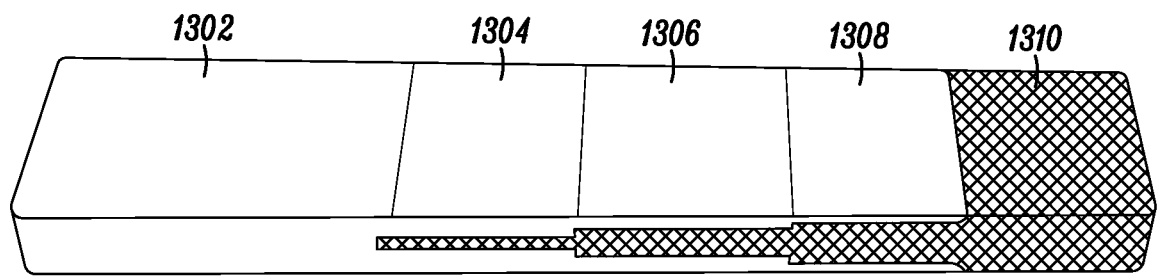
FIG. 13 depicts a grayscale surface with interdigitated layers.

FIG. 13 depicts a grayscale surface with interdigitated layers. In particular, it will be noted that a translucent material may be deposited both below and above an opaque material to provide multiple overlaps of the opaque build material and the translucent. This technique may be used, for example, to improve structural integrity throughout the jointed region, or to impart desirable visual effects to exterior surfaces of a structure. The structure in FIG. 13 may be readily fabricated in successive layers (e.g., z-axis layers) so that a top or bottom surface of a vertically fabricated structure has the desired exterior surface grayscale pattern and the desired interdigitation for strength. However, it will be understood that similar techniques may also or instead be employed on sidewalls (e.g., vertical exterior walls of a vertically fabricated structure) or any other exterior walls of a structure. It will also be noted that, using opaque material at various depths, the image includes five grayscales tones including a white tone 1302, a light gray tone 1304, a medium gray tone 1306, a dark gray tone 1308, and a black tone 1310. However other numbers of layers may be used with corresponding levels of grayscale available for visual effects on an exterior surface of an object.

Figure 14:
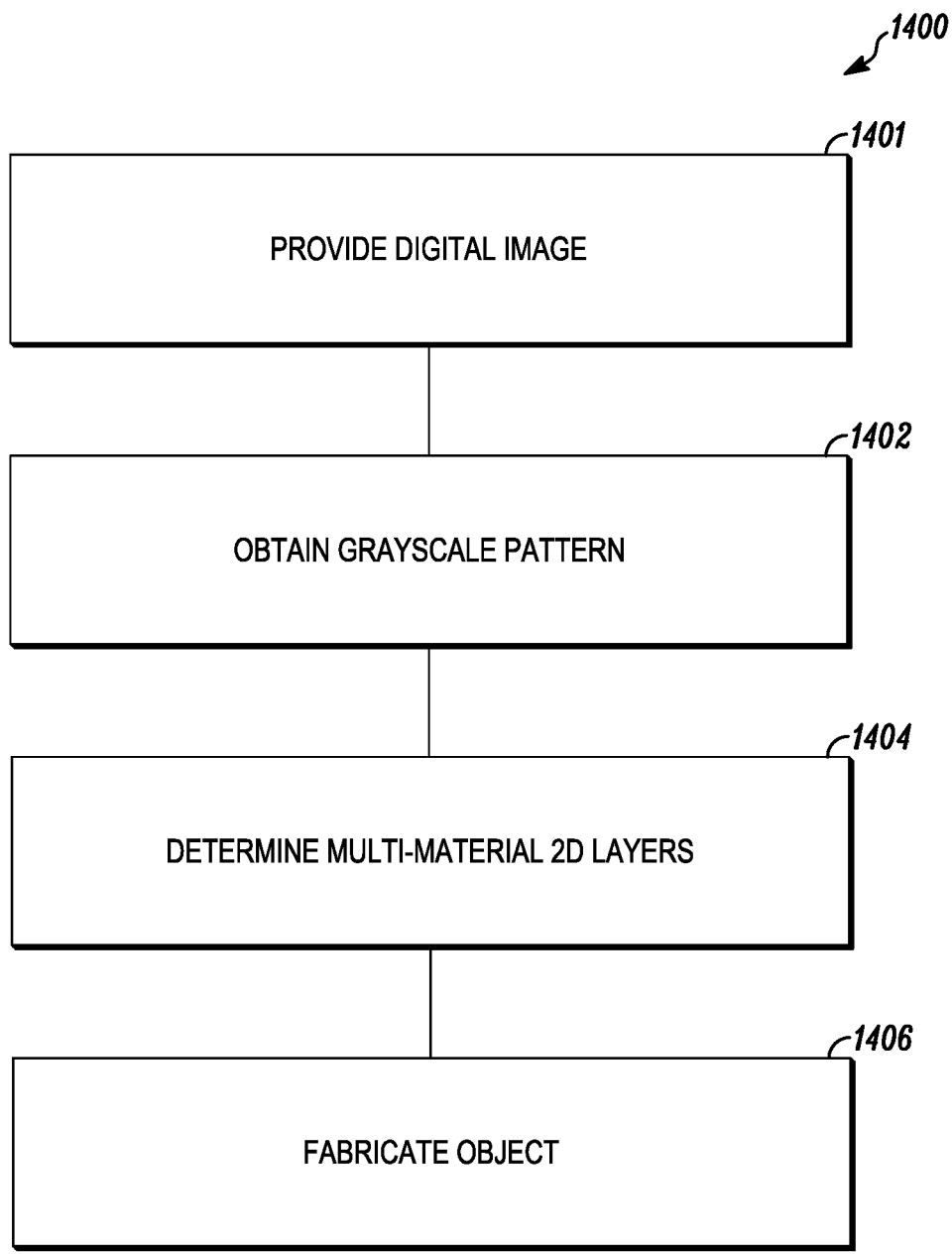
FIG. 14 shows a flow chart of a process to fabricate a structure with grayscale images on an exterior surface.

FIG. 14 shows a process 1400 for fabricated a structure with grayscale images on an exterior surface.

The process 1400 may begin with step 1401 where a digital image is provided. The digital image may be from a variety of sources such as a drawing application, technical drawing application, or other graphics or similar computerized source where a user can create or edit digital images. The digital image may be also or instead be obtained from a library of images including icons, photographs, sketches, thumbnails, clip art, and so forth. In another aspect, the digital image may be obtained from a digital camera or other digital image source. The digital image may also or instead include a texture image such as any pattern intended for tiling or other repeating, contiguous or non-contiguous use over an area of the surface. The digital image may also be in a variety of file formats, many of which are known in the art and may be suitably adapted as source images for grayscaling as contemplated herein.

In one aspect, a three-dimensional printer may include a wireless or wired communication port for coupling directly to a source of digital images. For example, the printer may include a USB port to couple to a digital camera, along with software and a user interface to retrieve images from the digital camera. A modeling environment for three-dimensional objects may provide markers or other annotations for a user to specify where an image is to be placed on an object without specifying what the image is. In this manner, a user may defer image selection until the object is fabricated. In another aspect, a printer may be configured to respond to receipt of an image by placing the image on a predetermined object and fabricating the predetermined object with the image in a predetermined location.

The process 1400 may proceed to step 1402 where a grayscale pattern is obtained for the digital image. The grayscale pattern may include a predetermined number of grayscale levels. This may include providing a custom-created grayscale image, or a computer-generated image derived from any of the digital image sources described above. For computer-generated images, a source image may be decomposed according to darkness, color, or the like into any number of grayscale levels according to the predetermined number of grayscale levels, which may be the number of grayscale levels available in a fabrication process as described above. This may include a fixed number of grayscale levels, or a variable number of grayscale levels according to user preferences and/or system limitations.

While grayscale images are conventionally rendered using gray, it will be understood that the techniques described herein are more generally applicable to images using any range of intensities for monochrome rendering based upon numerical values for each pixel location or other image region, and may be used with any underlying color (such as red, green, blue, and yellow, or cyan, magenta, yellow, and black, or any mixture of the foregoing,) to provide varying degrees of color saturation or intensity for that color. In addition, color-varying effects may be usefully achieved by overlaying materials with different colors and/or translucence to obtain varying color spectra instead of or in addition to varying color intensity. Any such range of colors may also be represented on a scale correlated to an amount of mixing, which color scale may also be used to describe individual pixel/location values for a digital image using a variety of techniques known in the art. Accordingly, the term grayscale as used herein is intended to describe any value or array of values that specify portions of an image according to a controllable or selectable scale of values, and does not imply any specific color or translucence of build materials that are overlapped according to a "grayscale" image of such values. A grayscale image as contemplated herein may be rendered in any color, or combination of overlapped colors according to the build materials selected for a fabrication process. Also contemplated herein is a controllable level of mixing for two or more different colors, where the 'grayscale' value represents a discrete level of mixing between two colors based upon use of overlapping build materials as described above. Thus grayscaling should be generally understood to refer generally to the manner in which a visual effect is specified (with a single value) rather than the color of the resulting object, and all such variations of black and white intensity, color intensity, and/or color mixing that can be obtained with various build materials using the techniques described above are intended to fall within the meaning of 'grayscale' as that term is used herein unless a different meaning is explicitly stated or otherwise clear from the context.

As shown in step 1404, a pattern for a number of multi-material, two-dimensional layers may be determined based upon the distribution of grayscale tones determined in step 1402. This may for example include determining a pattern for a plurality of two-dimensional layers of a first material and a second material, where the first material is substantially opaque and the second material is substantially translucent, such as the black and white build materials described above. In general, the pattern for the plurality of two-dimensional layers may be selected to impart the grayscale pattern for the image onto an exterior surface of an object. This process may be automated, and may include any of the layering techniques described above. Thus for example, a user may provide a picture that may be converted into grayscale using the grayscale levels available to a particular fabrication process, and the resulting grayscale image may be placed at any desired location on a surface of a model for a three dimensional object.

It will further be appreciated that references to two-dimensional layers in the preceding description refer to single layers of material in a fabrication process. While such layers necessarily have a thickness (e.g., for a processing plane at a z-axis top or bottom of an object) or width (e.g., for a side wall or other exterior layer of a fabricated object) that imparts three-dimensional shape, this dimension is typically well characterized, relatively consistent, and limited/controlled by physical processing capabilities of a printer 100. The resulting layer (e.g., an x-y tool path or deposition pattern and/or resulting shape) may be adequately characterized in two dimensions. Thus the term two-dimensional as used in this context is intended to refer to a single processing layer in a three-dimensional build process rather than strict mathematical two-dimensionality.

As shown in step 1406, an object may be fabricated using the multi-material, two-dimensional layers determined above. This may include fabricating the object from the plurality of two-dimensional layers using the first material and the second material according to the pattern. For example, the controller of an additive fabrication system such as any of the systems described above may be configured to operate an extruder and an x-y-z positioning system to fabricate an object from two or more materials. More specifically, the controller may control delivery of the two materials in a manner that imparts a grayscale image of the digital image to an exterior surface of the object by selectively layering the substantially translucent material over the substantially opaque material to obtain one or more predetermined grayscale levels of the grayscale image. The controller may also include a processor configured to receive a digital image and to perform any desired conversions as discussed above, or a pre-processed image with suitable grayscale levels may be provided to the controller from another source. Thus in general a physical object may be fabricated having a shape derived from a three-dimensional model and a grayscale image on the surface thereof derived from a grayscale image.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. In one aspect, the various sub-pixel and/or surface texturing techniques described herein may be used in combination with the grayscaling techniques described herein to provide overlapping layers of variable thickness, thereby providing more general control of grayscale rendered colors.

It should also be appreciated that the visualization techniques disclosed herein may be readily adapted to use more than two materials layered together, such as with two or more different colored translucent materials layered sequentially on top off a base color.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An article of manufacture formed by a three-dimensional printing process including a deposition of multiple layers of at least two build materials, comprising:
    an exterior surface having a grayscale image comprising regions with a predetermined number of grayscale levels, each one of the predetermined number of grayscale levels rendered using a different number and arrangement of layers of the at least two build materials, the at least two build materials including a substantially opaque build material and a substantially translucent build material, wherein the substantially opaque build material is disposed at various depths beneath the substantially translucent build material corresponding to each of the predetermined number of grayscale levels.

2. The article of claim 1, wherein the predetermined number of grayscale levels includes three or more grayscale levels.

3. The article of claim 1, wherein the predetermined number of grayscale levels includes three, four, or five grayscale levels.

4. The article of claim 1, further comprising multiple overlaps of the substantially opaque build material and the substantially translucent build material in at least one region.

5. The article of claim 1, wherein the exterior surface is derived from a digital image.

6. The article of claim 5, wherein deriving the exterior surface from the digital image includes decomposing the digital image according to darkness or color into grayscale levels according to the predetermined number of grayscale levels.

7. The article of claim 5, wherein the digital image is a digital photograph.

8. The article of claim 5, wherein the digital image is a texture image for repeated instantiation on the exterior surface.

9. The article of claim 1, wherein the substantially opaque build material is a black build material.

10. The article of claim 1, wherein the substantially opaque build material is a colored material having at least one of a cyan color, a magenta color, and a yellow color.

11. The article of claim 1, wherein the substantially opaque build material is a colored material having at least one of a red color, a blue color, and a green color.

12. The article of claim 1, wherein the substantially translucent build material is a white build material.

13. The article of claim 1, further comprising a third material having a different color than one or more of the substantially opaque build material and the substantially translucent build material.

14. The article of claim 1, further comprising a third material having a different opacity than one or more of the substantially opaque build material and the substantially translucent build material.

15. The article of claim 1, further comprising a third material having a different translucency than one or more of the substantially opaque build material and the substantially translucent build material.

16. The article of claim 1, wherein the exterior surface is a z-axis top surface of the article.

17. The article of claim 1, wherein the exterior surface is a z-axis bottom surface of the article.

18. The article of claim 1, wherein the exterior surface is a sidewall of the of the article.

19. The article of claim 1, wherein the deposition of multiple layers of the at least two build materials includes extruding successive layers of material in two-dimensional patterns derived from a computer model of the article.

20. The article of claim 1, wherein the grayscale image includes a monochrome rendering of an underlying color of the substantially opaque build material.

* * * * *